(12) United States Patent
Glatt

(10) Patent No.: US 7,006,976 B2
(45) Date of Patent: Feb. 28, 2006

(54) APPARATUS AND METHOD FOR INSERTING DATA EFFECTS INTO A DIGITAL DATA STREAM

(75) Inventor: Terry L. Glatt, Boca Raton, FL (US)

(73) Assignee: Pace Micro Technology, LLP, Boca Raton, FL (US)

(*) Notice: Subject to any disclaimer, the term of this patent is extended or adjusted under 35 U.S.C. 154(b) by 766 days.

(21) Appl. No.: 10/061,060

(22) Filed: Jan. 29, 2002

(65) Prior Publication Data

US 2003/0144833 A1    Jul. 31, 2003

(51) Int. Cl.
*G10L 21/00* (2006.01)

(52) U.S. Cl. ............................. 704/500; 386/48; 386/92

(58) Field of Classification Search ................ 704/500; 386/48, 92

See application file for complete search history.

(56) References Cited

U.S. PATENT DOCUMENTS

| | | | |
|---|---|---|---|
| 5,483,538 A | | 1/1996 | Rainbolt |
| 5,506,903 A | | 4/1996 | Yamashita |
| 5,590,064 A | | 12/1996 | Astle |
| 5,668,840 A | | 9/1997 | Takano |
| 6,034,746 A | * | 3/2000 | Desai et al. ............ 375/240.26 |
| 6,493,872 B1 | * | 12/2002 | Rangan et al. ................. 725/32 |
| 6,819,863 B1 | * | 11/2004 | Dagtas et al. ................... 386/46 |

FOREIGN PATENT DOCUMENTS

| | | |
|---|---|---|
| EP | 0 795 870 | 9/1997 |
| WO | WO 096/38843 | 12/1996 |

OTHER PUBLICATIONS

Broadcom Corporation, BCM7020R Product Brief, entitled "High Definition Video UMA Subsystem with 2D Graphics", Oct. 12, 2001.

* cited by examiner

*Primary Examiner*—Daniel Abebe
(74) *Attorney, Agent, or Firm*—Chinh H. Pham; Greenberg Traurig LLP

(57) ABSTRACT

The method includes receiving a signal to insert a data effect into a digitally encoded, framed data stream, retrieving a data effect having the same format as that of the data stream, detecting a first data stream frame boundary, inserting the data effect into the data stream at the first data stream frame boundary, detecting a second data stream frame boundary, and resuming the data stream at the second data stream frame boundary. If the data stream can be of more than one format, the format of the data stream can first be determined. The apparatus includes a processor and a multiplexor. The multiplexor is used for inserting the data effect into the data stream. The processor is used for detecting data stream frame boundaries, retrieving from a memory a data effect having the format of the data stream, and transmitting the formatted data effect to the multiplexor. The data stream may be an audio stream formatted in MPEG format (including MPEG-1, MPEG-2, MP3, MPEG-4), AC-3 format (including 2-channel, 5.1-channel, and 7.1-channel), or DTS format. The data effects may be stored in a plurality of formats. Synchronization between the video and audio streams is maintained by dropping frames that are replaced by the data effect. Another method generates a video signal by retrieving a video effect corresponding to an audio effect, inserting the video effect into a video stream associated with an audio stream, and resuming the video stream and audio stream.

42 Claims, 3 Drawing Sheets

| 509 | 508 | 507 | 506 | 505 | 504 | 503 | 502 | 501 |
|---|---|---|---|---|---|---|---|---|
| 10101001 | 00101001 | 01011100 | 01010000 | 10....01 | 00101000 | 11011001 | 11000100 | 11001010 |

| 509 | 508 | 507 | 523 | 522 | 521 | 503 | 502 | 501 |
|---|---|---|---|---|---|---|---|---|
| 10101001 | 00101001 | 01011100 | 11001001 | 01....10 | 01011101 | 11011001 | 11000100 | 11001010 |

APPARATUS AND METHOD FOR INSERTING DATA EFFECTS INTO A DIGITAL DATA STREAM

BACKGROUND OF THE INVENTION

This invention relates generally to the field of digital audio, video, and multimedia. More specifically, this invention relates to inserting audio or video effects into a digital audio or video stream.

Digitally-formatted audio ("digital audio") is becoming more popular because of its high quality, its use with computers and compact audio players, its ease of manipulation and duplication, and its ability to be shared by many people. Some digital audio formats include uncompressed formats such as Audio Compact Disc (PCM (pulse-code modulation) 16-bit/44.1 kHz) and Wave (name extension WAV (.wav)), and compressed formats such as MPEG (Moving Pictures Expert Group) layers 1, 2, 3 (MP3), MPEG-4, DTS® (Digital Theater Systems), and Dolby® Digital.

For many of the same reasons, movies and other video broadcasts are also increasingly being transmitted digitally. Thus, a digitally-formatted movie that is shown in a cinema or delivered to a user's television set from a broadcaster (such as a cable broadcaster) will include a digital video stream for the pictures and a digital audio stream for the soundtrack. One digital audio format used in movies is AC-3, which encodes multichannel audio. (Dolby® Digital audio is in Dolby® AC-3 format.) AC-3 is a compressed format (using perceptual coding) and can be broadcast in two-channel stereo, "5.1"-channel, or "7.1"-channel formats. The latter two formats are used in surround sound (e.g., Dolby® Surround Digital or Dolby® Surround AC-3). The 5.1-channel format includes left front, right front, and center front channels, left and right surround sound channels, and a low frequency effects channel (the "0.1") having one-tenth the bandwidth of the other channels. The 7.1-channel format is analogous to the 5.1-channel format, but includes two more main channels.

As television becomes more advanced, other applications can be integrated into the viewing experience. Innovations such as WebTV®, online shopping, electronic program guides, and TiVo® (personal video recorders) allow the television to be used for more than just watching TV. While a movie or song is being broadcast, it may be desirable to send an audible signal to the viewer or listener. One example of such a signal could be an alert from an application such as the America Online ("AOL") client that the viewer, if watching a movie on a home television, has received a new e-mail message. Other examples include a feedback sound (as part of the user interface) that alerts the user of the acceptance of some request (such as by using a remote control), or other sound effects or sound bites that may be used to signal the viewer or listener.

Conventionally, during an audio (analog or digital) broadcast, such a sound effect could be broadcast to the user directly, by mixing the sound effect with the soundtrack (primary stream). However, such mixing has several drawbacks. First, mixing of an analog or uncompressed digital sound effect requires mixing components, and mixing of a compressed digital sound effect destined for subsequent decoding requires decompressing (decoding) both the sound effect and the primary stream, mixing the uncompressed signals together, and recompressing (re-encoding) the mixed signal prior to its transmission to the target decoder. This can result in poor sound quality and/or a loss of synchronization between the audio and video. Second, where a set-top box ("STB") is used to receive programming, decoding advanced digital audio formats such as AC-3 is usually left to dedicated equipment (e.g., home theater equipment) external to the set-top box. Some means is therefore required for transporting to the external equipment the digital audio data for both the primary stream and the sound effect, adding cost and complexity to the set-up.

Other methods for adding data to a data stream have been disclosed. For instance, U.S. Pat. No. 6,034,746 discloses a system, method, and computer readable medium for inserting additional data, such as commercials, into a digital audio/visual data stream. That system, however, is designed for inserting additional data having attributes different from those of the primary data stream. As such, the system is complex and requires the decoder/receiver to be reinitialized with the attributes of the primary data stream after the additional data stream is played.

SUMMARY OF THE INVENTION

What is needed is a way to add a data effect such as a sound effect or sound bite to a compressed digital audio soundtrack without complex mixing, reinitialization, degradation of sound quality, loss of synchronization between the audio and video signals, or multiple connections between equipment.

The present invention provides an apparatus and method for generating a data signal using a digitally encoded (or formatted), framed data stream. The method includes receiving a signal to insert a data effect into the data stream, retrieving a data effect having the same format as that of the data stream, detecting a first data stream frame boundary, inserting the data effect into the data stream at the first data stream frame boundary, detecting a second data stream frame boundary, and resuming the data stream at the second data stream frame boundary. If the data stream can be of more than one format, the format of the data stream can first be determined. The data stream may be an audio stream formatted in MPEG format (including MPEG-1, MPEG-2, MP3, MPEG-4 and any later versions), AC-3 format (including 2-channel, 5.1-channel, 7.1-channel, and any later versions, and including Dolby® Digital AC-3 and Dolby® Digital Surround AC-3), or DTS format.

Another method of the present invention for generating a video signal includes receiving a signal to insert an audio effect into a digital audio stream, retrieving an audio effect having the same format as that of the audio stream, retrieving a video effect corresponding to the audio effect, inserting the audio effect into the audio stream at a first audio stream frame boundary, inserting the video effect into a video stream associated with the audio stream, and resuming the video stream and audio stream at a second audio stream frame boundary. The audio stream may be encoded in AC-3, MPEG, or DTS format.

A further method of the present invention maintains the synchronization between a video stream and an associated encoded and framed digital audio stream. The method inserts into the audio stream at a first audio stream frame boundary an audio effect having the format of the audio stream, disposes of frames displaced by the audio effect, and resumes the audio stream at a second audio stream frame boundary. As before, the audio stream may be encoded in AC-3, MPEG, or DTS format.

The apparatus of the present invention includes a multiplexor and a processor. The multiplexor is used for inserting the data effect into the data stream. The processor is used for detecting data stream frame boundaries, retrieving from a memory a data effect having the format of the data stream, and transmitting the formatted data effect to the multiplexor. If the data stream can be of more than one format, the processor can determine the format of the data stream. The data effects may be stored in a plurality of formats.

By having pre-formatted data effects already stored in a memory, the present invention generates a data signal including a data effect, such as an audio effect, which is switched into a currently streaming, framed, encoded, digital data stream without decoding the digital data stream. More than one data effect can be switched into a single digital data stream. Detecting frame boundaries and switching the data effect in on those boundaries prevents annoying artifacts, such as pops in an audio stream, from affecting the data stream. Because the pre-stored effects have the same format as the data stream, no reinitialization is required as in the prior art. The present invention maintains the synchronization between the video and audio streams by dropping frames that are replaced by the data effect. The present invention also allows pre-stored video effects corresponding to the audio effects to be broadcast in the video stream, synchronized with the audio effect.

Additional advantages of the invention will be set forth in the description which follows, and in part will be obvious from the description, or may be learned by practice of the invention. The advantages of the invention may be realized and obtained by means of the instrumentalities and combinations particularly pointed out in the appended claims.

BRIEF DESCRIPTION OF THE DRAWINGS

The accompanying drawings, in which like reference numerals represent like parts, are incorporated in and constitute a part of the specification. The drawings illustrate presently preferred embodiments of the invention and, together with the general description given above and the detailed description given below, serve to explain the principles of the invention.

DETAILED DESCRIPTION

The present invention switches into an encoded (or formatted), framed data stream a data effect with a format that matches the format of the data stream. The invention allows the data effect to be switched in without decoding the data stream and mixing the data stream and the data effect.

The description of the drawings uses a cable television arrangement including a set-top box (STB) and an external audio decoder to illustrate the present invention with respect to adding an audio effect to a digital audio stream. However, the invention is not limited to audio streams or cable television. Rather, the invention only requires a primary digital data stream, which may be audio, video, or other data, that is transmitted in frames or packets, and some type of secondary data effect, such as an audio or video effect, to be switched in. The data effect may be of any length, although it is noted that excessively long data effects may have the effect of displacing the primary data stream. Cable television is used as an example, but the invention may be used with satellite television, movies in a cinema, or in any other venue or medium broadcasting framed data streams.

Figure 1:
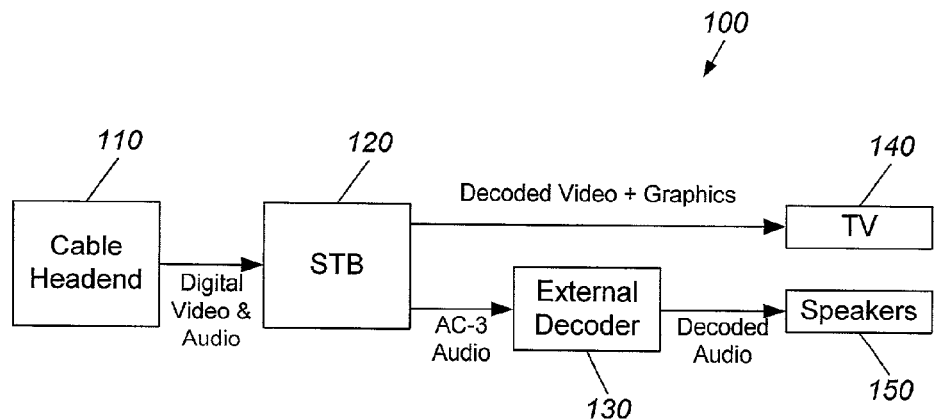
FIG. 1 is a block diagram showing an embodiment of the present invention.

FIG. 1 illustrates an arrangement 100 in which a cable headend 110 broadcasts or transmits a digital data stream, such as a movie, to a customer's set-top box 120. The movie can be made up of an audio stream and a video stream. The video stream may be encoded, for example, in an MPEG format, which includes any of the current or future MPEG or digital video formats. Other digital formats known in the art, such as Quicktime®, MJPEG, ASF (Advanced Streaming Format), and AVI (Audio Video Interleaved), may be used. The audio stream may be encoded in AC-3 format or some other suitable digital format such as DTS®, DTS-ES (Extended Surround), Dolby® Digital-Surround EX, DSD® (Direct Stream Digital), or the MPEG Audio layers. "AC-3 format" includes Dolby® Digital AC-3 format (2-channel) and Dolby® Surround Digital AC-3 format (5.1-channel and 7.1-channel). As noted above, the key property of these data streams is that they be digitally encoded/formatted and framed or packetized.

In the illustrated embodiment, STB 120 separates the stream from the cable headend into audio and video streams and then decodes the MPEG video stream and outputs it as video for display. As shown in more detail in FIG. 2, STB 120 typically includes a transport processor 210, memory 220, a digital video decoder 230, a graphics engine 240, a compositor 250, and an SPDIF (Sony/Philips Digital Interface) output generator 260. In one embodiment, a single Broadcom 7020 high-definition video graphics subsystem chip may be used, which includes the transport processor, the digital video decoder, the graphics engine, the compositor, and the SPDIF generator, among other components. Transport processor 210 receives the movie stream from cable headend 110 and separates the stream into digital audio and video streams. The digital video stream (e.g., MPEG) is transmitted to digital video decoder 230 which decodes the stream into analog video. Graphics engine 240 generates display graphics (which may be stored in memory 220), and transmits that signal to compositor 250 for mixing with the video and transmission to TV 140. In a conventional STB, the digital audio stream is transmitted from transport processor 210 to SPDIF generator 260 for output to and decoding by external decoder 130. In the present invention, as discussed below, effect switcher 200 is added to the digital audio path.

Although STB 120 could include circuitry to decode the AC-3 audio stream, the STB normally does not include such capability. This decoding is generally performed by external decoder 130. External decoders, made by a number of manufacturers including VideoLogic and Yamaha, may be dedicated and equipped with speakers and an amplifier or may be part of a home theatre system that includes an audio/video receiver and preamplifier with the appropriate format (e.g., AC-3) decoder. After external decoder 130 decodes the AC-3 audio stream, the decoded audio stream is transmitted to speakers 150 (which may be part of external decoder 130, a home theatre system, or TV 140) for broadcast.

Figure 2:
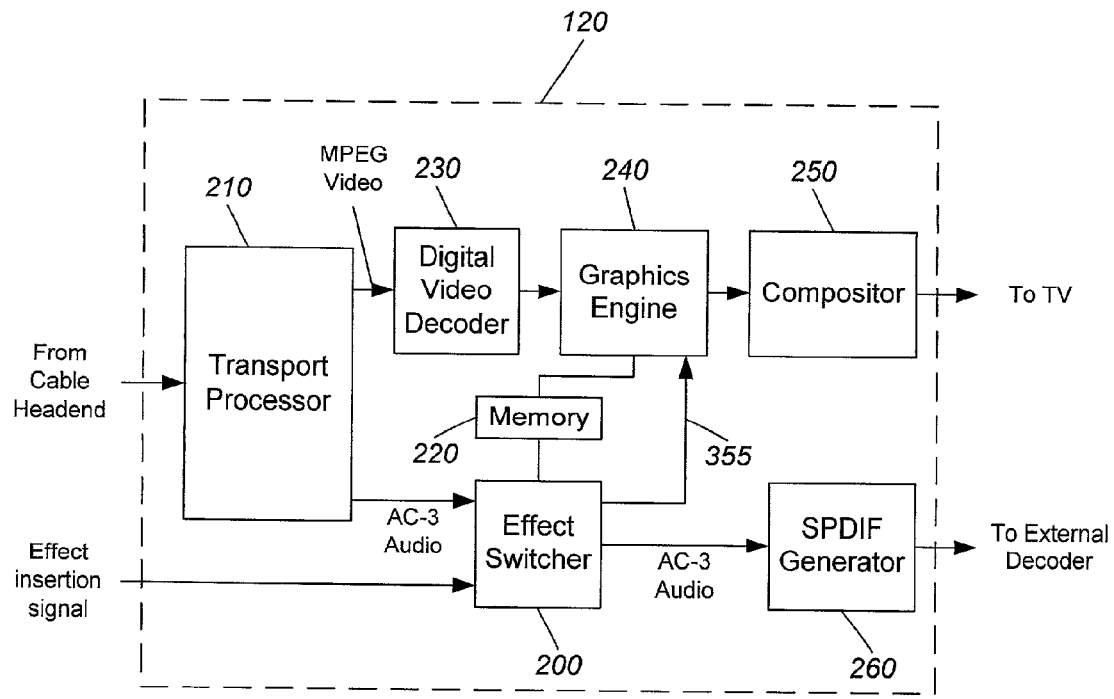
FIG. 2 is a block diagram of a set-top box in accordance with an embodiment of the present invention.

Effect switcher 200, as shown in FIG. 2, which performs most of the steps of the present invention, is included as a component of STB 120. Other embodiments may include effect switcher 200 as a separate component placed between STB 120 and external decoder 130 or as a component of external decoder 130.

Effect switcher 200 can include processor 310 and multiplexor 320. Processor 310 can be any processor, such as a microprocessor or digital signal processor (DSP), capable of outputting control signals, acting on digital data, and interacting with a memory, such as Intel® Pentium processors, MIPS processors, Motorola® Power PC processors, or Analog Devices® SHARC processors, for example. Memory 220 is shown in FIG. 2 as an input to processor 310 and is pictured as a hard disk drive, for example, but can be any type of memory, including RAM. Multiplexor 320 minimally must be able to multiplex the incoming digital data stream with a data effect at the bit level, and can be implemented in software or programmable logic or as an ASIC (application specific integrated circuit).

Figure 4:
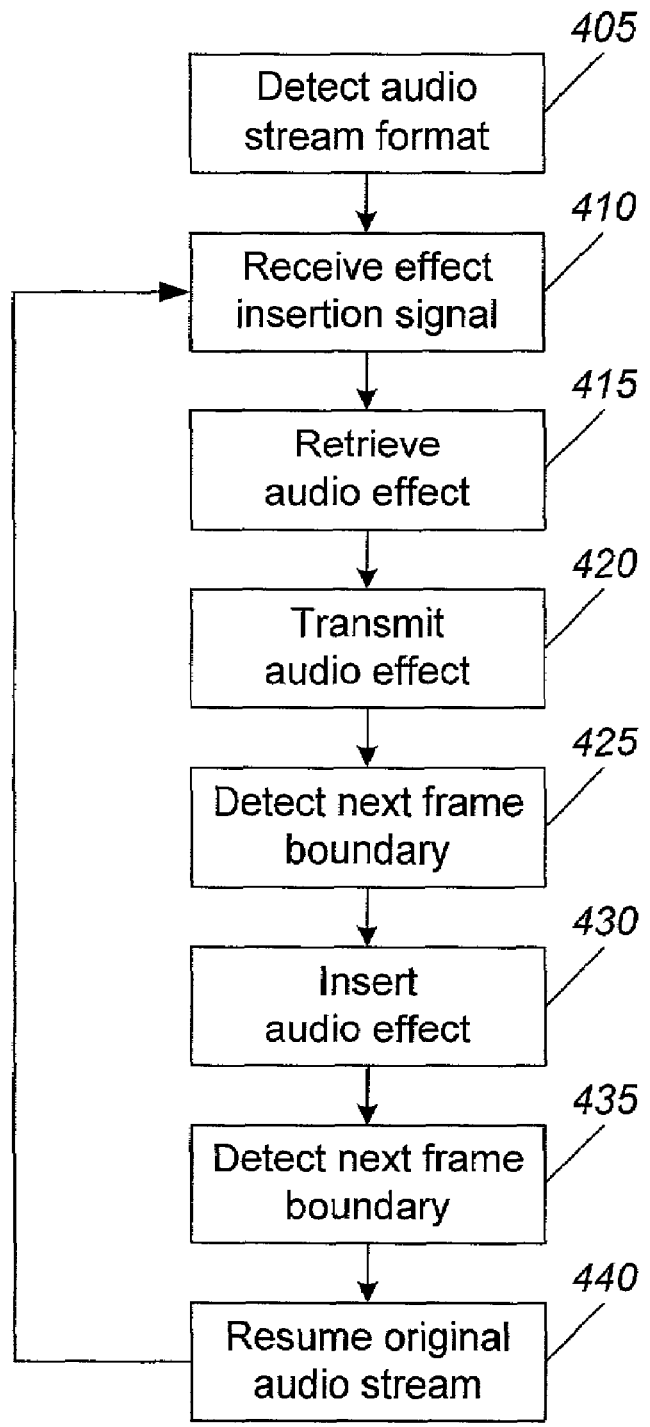
FIG. 4 is a flowchart illustrating the steps for inserting an audio effect in accordance with an embodiment of the present invention.

FIG. 4 is a flowchart describing the operation of effect switcher 200. After transport processor 210 receives a digitally encoded and framed audio and video stream from cable headend 110, the transport processor splits the stream into audio and video streams. The video stream (in MPEG format, for example) is decoded and transmitted to TV 140. The audio stream (in AC-3 format, for example) is transmitted to effect switcher 200. In step 405, processor 310 looks at the stream headers to detect the format of the primary audio stream received from transport processor 210. As mentioned before, this format could be 2-channel, 5.1-channel, or 7.1-channel AC-3, MPEG (or MP3), or other digital audio format. In step 410, processor 310 receives a signal to insert an audio effect into the audio stream. This signal can come, for example, from an e-mail or Internet browser application running on the STB platform, from the cable broadcaster sending an important message to the viewer, or from an interactive program guide running on the STB platform. Examples of audio effects are a short "beep" or a "bong" sound (such as occurs with Microsoft Outlook or Lotus Notes) or a longer sound bite such as "You've Got Mail" (such as occurs with America Online) indicating a newly arrived e-mail message, a short sound indicating that some third-party information (such as a weather advisory) is appearing on the television screen, a short sound indicating that a user's entry on a remote keypad, for example, has been received by the STB, a longer message from a stock ticker indicating a favorite stock has hit a specified target price, etc., a tone indicating that the front door bell is ringing, and a ring indicating a telephone call from an expected caller (using Caller ID). The flowchart in FIG. 4 reflects that the format does not change very often (e.g., once at the beginning of each movie). However, if the audio encoding format is less consistent and subject to frequent change, requiring processor 310 to determine the format "on the fly," steps 405 and 410 could be interchanged.

In step 415, processor 310 retrieves from memory 220 the audio effect indicated by the insertion signal and having the correct format as detected by the processor. Thus, memory 220 must have pre-stored a number of different sound effects (e.g., beep, bong, "you've got mail," "stock alert," etc.) in each of the different formats in which a movie or program could be broadcast. In step 420, processor 310 transmits to multiplexor 320 over data line 345 the appropriate sound effect and, in step 425, monitors the primary audio stream for the next frame boundary. Once the frame boundary is detected, processor 310 transmits over control line 335 a control signal to multiplexor 320 to insert the audio effect into the primary audio stream. In step 430, multiplexor 320 inserts the audio effect into the primary audio stream. When the audio effect is finished, in step 435 processor 310 monitors the primary audio stream for the next frame boundary, and, when the next frame boundary is detected, notifies multiplexor 320 to resume transmitting in step 440 the primary audio stream. The flowchart then loops back to step 410 to wait for the next insertion signal so as to add more audio effects to the audio stream.

Some of the other steps shown in FIG. 4 and described above may be performed in other than the exact order shown. For instance, depending on the timing between processor 310 and multiplexor 320, the audio effect does not have to be transmitted to multiplexor 320 before the frame boundary is detected, as shown in steps 420 and 425. Instead, after retrieving the audio effect from memory 220 in step 415, processor 310 detects the next frame boundary and, when found, transmits the audio effect over data line 345 to multiplexor 320 at the same time the processor transmits the control signal over control line 335 to multiplexor 320.

Figures 3, 5A, 5B:
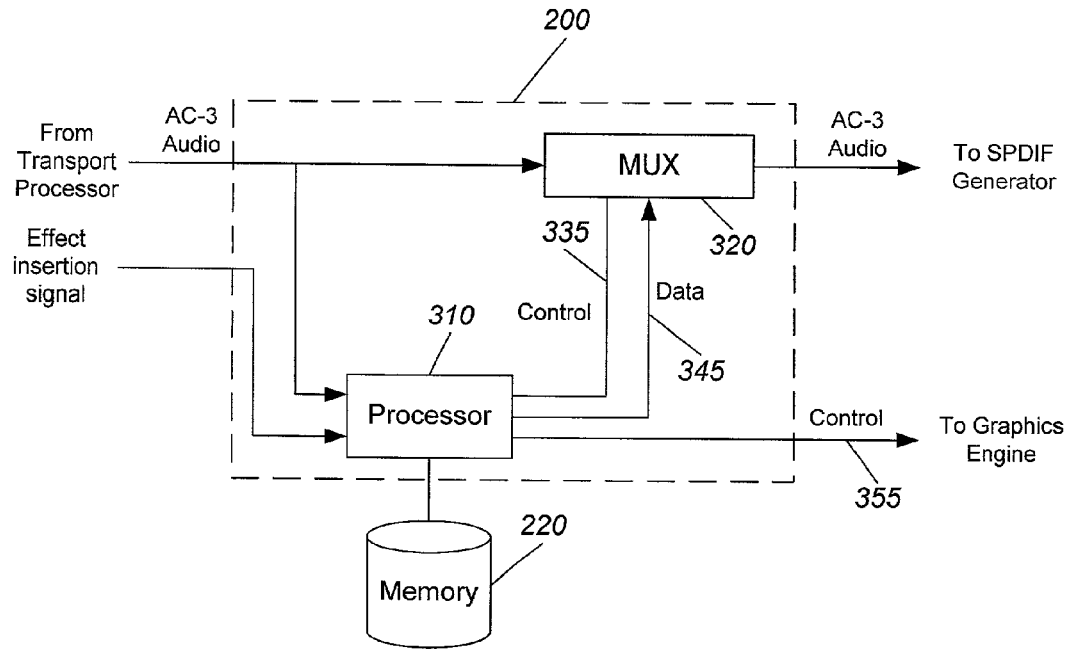
FIG. 3 is a block diagram of an effect switcher that inserts an audio effect in accordance with an embodiment of the present invention.
FIGS. 5A and 5B illustrate a data stream before and after an audio effect has been inserted in accordance with an embodiment of the present invention.

It should be noted that in order to maintain the synchronization between the primary audio stream and the associated video stream, the audio effect frames actually replace the audio stream frames that were originally transmitted by the STB. Thus, while the audio effect is being inserted into the primary audio stream, the replaced audio stream frames are disposed of (or "dropped") by processor 310. This process is depicted in FIGS. 5A and 5B. FIG. 5A is a schematic of the primary audio stream which is made up of many audio frames 501, 502, . . . , 509. (Note that reference numeral 505 indicates a plurality of audio frames.) FIG. 5B is a schematic of the modified audio stream with the audio effect, made up of frames 521–523, inserted between frames 503 and 507 (again, note that reference numeral 522 indicates a plurality of audio frames). The streams in both FIGURES are synchronized with the video stream because frames 504–506 have been dropped. Generally, the video stream has already been decoded into analog video and may or may not contain graphics.

The present invention can be used to indicate other types of audio effects, such as in home networking applications where the user sets an alarm or indicator, e.g., oven timer, alarm clock/reminder, or wants to hear the door bell, door alarm, fire/burglar alarm, baby monitor, and signals from other appliances in the home—even a PC—and wants to hear the audible while listening to audio on a home theater.

In addition, the present invention can be used to generate a video effect that correlates with an audible signal. For instance, a pre-stored, pre-formatted video effect, such as an icon or characters, can be displayed on the TV screen if the effect switcher receives an effect insertion signal from one of the applications running on the STB. Thus, if the audible signal is receipt of e-mail, an icon of a mailbox could flash on the TV screen. Similarly, if the audible signal is generated by a baby monitor, an icon of a baby crying could flash on the TV screen. Other audio effect/video icon pairs could be used, such as oven timer/alarm clock icon, door bell/open door icon, fire alarm/fire truck icon, etc. Alphanumeric characters could be displayed along with or instead of an icon. Such an icon or characters can be generated by having the effect switcher send a signal to graphics engine 240 on control line 355 to fetch from the memory a pre-stored, analog video icon or character display, which is transmitted to compositor 250 to display on TV 140 at the same time the corresponding audio effect is broadcast on speakers 150.

As discussed above, additional advantages and modifications will readily occur to those skilled in the art. Therefore, the present invention in its broader aspects is not limited to the specific embodiments, details, and representative devices shown and described herein. Accordingly, various changes, substitutions, and alterations may be made to such embodiments without departing from the spirit or scope of the general inventive concept as defined by the appended claims.

We claim:

1. A method for generating a data signal using an encoded and framed digital data stream, the method comprising:
   receiving a signal to insert a data effect into the data stream;
   identifying, from a number of different data effects, one that has a format of the data stream;
   retrieving the data effect having the format of the data stream;
   detecting a first data stream frame boundary;
   inserting the data effect into the data stream at the first data stream frame boundary;
   detecting a second data stream frame boundary; and
   resuming the data stream at the second data stream frame boundary.

2. The method according to claim 1, further comprising determining the format of the data stream, wherein the retrieved data effect has the same format as that of the data stream.

3. The method according to claim 1, wherein the data stream is an audio stream.

4. The method according to claim 3, wherein the data effect is an audio effect.

5. The method according to claim 4, wherein the audio stream is encoded in AC-3 format.

6. The method according to claim 5, wherein the audio stream is encoded in 2-channel AC-3 format.

7. The method according to claim 5, wherein the audio stream is encoded in 5.1-channel AC-3 format.

8. The method according to claim 5, wherein the audio stream is encoded in 7.1-channel AC-3 format.

9. The method according to claim 4, wherein the audio stream is encoded in MPEG format.

10. The method according to claim 4, wherein the audio stream is encoded in DTS format.

11. A method for generating an audio signal using an encoded and framed digital audio stream, the method comprising:
    detecting a first audio stream frame boundary;
    identifying, from a number of different pre-stored audio effects, one that has a format of the audio stream;
    inserting into the audio stream at the first audio stream frame boundary the pre-stored audio effect having the format of the audio stream;
    detecting a second audio stream frame boundary; and
    resuming the audio stream at the second audio stream frame boundary.

12. The method according to claim 11, further comprising determining the format of the audio stream, wherein the pre-stored audio effect has the same format as that of the audio stream.

13. The method according to claim 11, wherein the audio stream is encoded in AC-3 format.

14. The method according to claim 13, wherein the audio stream is encoded in 2-channel AC-3 format.

15. The method according to claim 13, wherein the audio stream is encoded in 5.1-channel AC-3 format.

16. The method according to claim 13, wherein the audio stream is encoded in 7.1-channel AC-3 format.

17. The method according to claim 11, wherein the audio stream is encoded in MPEG format.

18. The method according to claim 11, wherein the audio stream is encoded in DTS format.

19. A method for generating a video signal, the method comprising:
    receiving a signal to insert an audio effect into an encoded and framed digital audio stream;
    identifying, from a number of different audio effects, one that has a format of the audio stream
    retrieving the audio effect having the format of the audio stream;
    retrieving a video effect corresponding to the audio effect;
    inserting the audio effect into the audio stream at a first audio stream frame boundary;
    inserting the video effect into a video stream associated with the audio stream; and
    resuming the video stream and the audio stream at a second audio stream frame boundary.

20. The method according to claim 19, further comprising determining the format of the audio stream, wherein the retrieved audio effect has the same format as that of the audio stream.

21. The method according to claim 19, wherein the audio stream is encoded in AC-3 format.

22. The method according to claim 19, wherein the audio stream is encoded in MPEG format.

23. The method according to claim 19, wherein the audio stream is encoded in DTS format.

24. A method for maintaining synchronization between a video stream and an associated encoded and framed digital audio stream, the method comprising:
    inserting into the audio stream at a first audio stream frame boundary an audio effect having the format of the audio stream;
    disposing of frames displaced by the audio effect; and
    resuming the audio stream at a second audio stream frame boundary.

25. The method according to claim 24, wherein the audio stream is encoded in AC-3 format.

26. The method according to claim 24, wherein the audio stream is encoded in MPEG format.

27. The method according to claim 24, wherein the audio stream is encoded in DTS format.

28. An apparatus for generating a data signal using an encoded and framed digital data stream, the apparatus comprising:
    a multiplexor for inserting a data effect into the data stream; and
    a processor for detecting frame boundaries in the data stream between which the data effect is inserted, for identifying, from a number of different data effects, one that has a format of the data stream, for retrieving from a memory the data effect having the format of the data stream, and for transmitting the formatted data effect to the multiplexor.

29. The apparatus according to claim 28, wherein the processor determines the format of the data stream.

30. The apparatus according to claim 28, wherein the data effects are stored in a plurality of formats.

31. The apparatus according to claim 28, wherein the data stream is an audio stream.

32. The apparatus according to claim 31, wherein the data effect is an audio effect.

33. The apparatus according to claim 32, wherein the audio stream is encoded in AC-3 format.

34. The apparatus according to claim 33, wherein the audio stream is encoded in 2-channel AC-3 format.

35. The apparatus according to claim 33, wherein the audio stream is encoded in 5.1-channel AC-3 format.

36. The apparatus according to claim 33, wherein the audio stream is encoded in 7.1-channel AC-3 format.

37. The apparatus according to claim 32, wherein the audio stream is encoded in MPEG format.

38. The apparatus according to claim 32, wherein the audio stream is encoded in DTS format.

39. A method for generating a data signal using an encoded and framed digital data stream, the method comprising:
- receiving a signal to insert a data effect into the data stream;
- retrieving, the data effect having the format of the data stream;
- detecting a first data stream frame boundary;
- inserting the data effect into the data stream at the first data stream frame boundary;
- detecting a second data stream frame boundary;
- disposing of frames displaced by the data effect; and
- resuming the data stream at the second data stream frame boundary.

40. A method for generating an audio signal using an encoded and framed digital audio stream, the method comprising:
- detecting a first audio stream frame boundary;
- inserting into the audio stream at the first audio stream frame boundary the pre-stored audio effect having the format of the audio stream;
- detecting a second audio stream frame boundary;
- disposing of frames displaced by the audio effect; and
- resuming the audio stream at the second audio stream frame boundary.

41. A method for generating a video signal, the method comprising:
- receiving a signal to insert an audio effect into an encoded and framed digital audio stream;
- retrieving the audio effect having the format of the audio stream;
- retrieving a video effect corresponding to the audio effect;
- inserting the audio effect into the audio stream at a first audio stream frame boundary;
- inserting the video effect into a video stream associated with the audio stream;
- disposing of frames displaced by the audio effect; and
- resuming the video stream and the audio stream at a second audio stream frame boundary.

42. An apparatus for generating a data signal using an encoded and framed digital data stream, the apparatus comprising:
- a multiplexor for inserting a data effect into the data stream; and
- a processor for detecting frame boundaries in the data stream between which the data effect is inserted, for retrieving from a memory the data effect having the format of the data stream, for disposing of frames displaced by the data effect, and for transmitting the formatted data effect to the multiplexor.

* * * * *

UNITED STATES PATENT AND TRADEMARK OFFICE
CERTIFICATE OF CORRECTION

PATENT NO. : 7,006,976 B2  
APPLICATION NO. : 10/061060  
DATED : February 28, 2006  
INVENTOR(S) : Terry L. Glatt Page 1 of 1

It is certified that error appears in the above-identified patent and that said Letters Patent is hereby corrected as shown below:

Title Page of Patent #73: "Assignee" is:

Pace Micro Technology, PLC  
West Yorkshire, England

Signed and Sealed this

Nineteenth Day of December, 2006

JON W. DUDAS  
*Director of the United States Patent and Trademark Office*